United States Patent
Witt

(10) Patent No.: US 11,958,472 B2
(45) Date of Patent: Apr. 16, 2024

(54) METHOD FOR CONTROLLING A HYBRID DRIVE TRAIN

(71) Applicant: Schaeffler Technologies AG & Co. KG, Herzogenaurach (DE)

(72) Inventor: Holger Witt, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/796,883

(22) PCT Filed: Jan. 28, 2021

(86) PCT No.: PCT/DE2021/100082
§ 371 (c)(1),
(2) Date: Aug. 2, 2022

(87) PCT Pub. No.: WO2021/164812
PCT Pub. Date: Aug. 26, 2021

(65) Prior Publication Data
US 2023/0058410 A1    Feb. 23, 2023

(30) Foreign Application Priority Data
Feb. 20, 2020    (DE) .................... 10 2020 104 503.4

(51) Int. Cl.
*B60W 30/20*    (2006.01)
*B60W 10/02*    (2006.01)
(Continued)

(52) U.S. Cl.
CPC ............ *B60W 20/40* (2013.01); *B60W 10/02* (2013.01); *B60W 10/08* (2013.01);
(Continued)

(58) Field of Classification Search
CPC ...... B60W 20/40; B60W 20/17; B60W 10/02; B60W 10/08; B60W 30/20;
(Continued)

(56) References Cited

U.S. PATENT DOCUMENTS 10,663,030 B2    5/2020   Yanaze et al.
2009/0048747 A1*  2/2009  Stridsberg ............. B60W 10/02
                                                701/55
(Continued)

FOREIGN PATENT DOCUMENTS

DE           10227528 A1    1/2004
DE      102008009201 A1 *   8/2009 ............... B60K 6/48
(Continued)

*Primary Examiner* — Roger L Pang

(57) ABSTRACT

A method is provided for controlling a hybrid drive train comprising a first partial drive train including an internal combustion engine having a crankshaft and a second partial drive train, which is separated from the first partial drive train by a torsional elasticity, having an electric machine with a rotor. A rotational characteristic value of the first partial drive train is detected via a sensor arranged on the torsional elasticity. A rotational characteristic value of the rotor is detected via a device engaged with the rotor. A quality index is determined based on the rational characteristic value of the first partial drive train and the rotational characteristic value of the rotor. The electric machine is controller to optimize the quality index.

18 Claims, 1 Drawing Sheet

(51) Int. Cl.
*B60W 10/08* (2006.01)
*B60W 20/40* (2016.01)
*B60W 30/186* (2012.01)

(52) U.S. Cl.
CPC .......... *B60W 30/186* (2013.01); *B60W 30/20* (2013.01); *B60W 2030/206* (2013.01); *B60W 2510/0638* (2013.01); *B60W 2510/081* (2013.01); *B60W 2710/081* (2013.01); *B60Y 2300/58* (2013.01)

(58) Field of Classification Search
CPC ... B60W 2030/206; B60W 2510/0638; B60W 2510/081; B60W 2710/081; B60Y 2300/58; B60L 2240/421; B60L 2240/441
USPC ........................................................... 477/5
See application file for complete search history.

(56) References Cited

U.S. PATENT DOCUMENTS

| | | | |
|---|---|---|---|
| 2018/0290659 A1 | 10/2018 | Tsukada et al. | |
| 2020/0254993 A1* | 8/2020 | Siokos | B60L 50/16 |

FOREIGN PATENT DOCUMENTS

| | | |
|---|---|---|
| DE | 102009013409 A1 | 10/2009 |
| DE | 102015211178 A1 | 12/2016 |
| DE | 102015211593 A1 | 12/2016 |
| DE | 102016208477 A1 | 11/2017 |
| DE | 102017101551 A1 | 7/2018 |
| DE | 102017218656 A1 | 4/2019 |
| EP | 2609411 B1 | 7/2018 |
| EP | 3119656 B1 | 6/2020 |
| JP | 2010143398 A | 7/2010 |
| WO | 2008080378 A1 | 7/2008 |
| WO | 2012025434 A2 | 3/2012 |

* cited by examiner

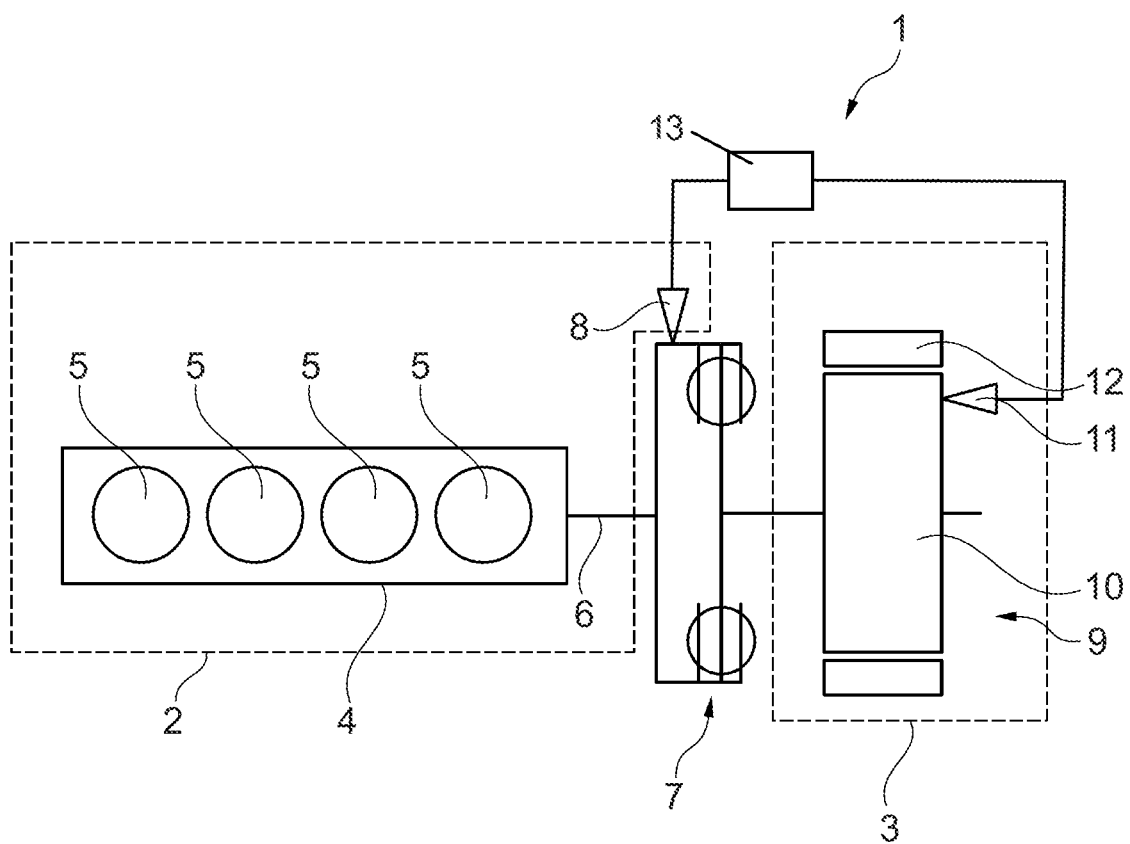

METHOD FOR CONTROLLING A HYBRID DRIVE TRAIN

This application is the U.S. National Phase of PCT Appln. No. PCT/DE2021/100082 filed Jan. 28, 2021, which claims priority to DE 102020104503.4 filed Feb. 20, 2020, the entire disclosures of which are incorporated by reference herein.

TECHNICAL FIELD

The disclosure relates to a method for controlling a hybrid drive train having a first partial drive train with an internal combustion engine having a crankshaft and a first device for detecting rotational characteristic values of the crankshaft for controlling the internal combustion engine and a second partial drive train, separated from the first partial drive train by a torsional elasticity for torsional oscillation insulation from torsional oscillations from the internal combustion engine, with an electric machine having a rotor and a second device for detecting rotational characteristic values of the rotor for controlling the electric machine.

BACKGROUND

Hybrid drive trains having an internal combustion engine subject to torsional vibrations and an electric machine are known. For torsional vibration insulation of the torsional vibrations, a torsional elasticity; for example, a torsional vibration damper, can be arranged between the internal combustion engine and the electric machine. In addition, the internal combustion engine can be subject to misfiring, which puts a strain on the components of the hybrid drive train and can lead to a build-up of torsional elasticity.

A hybrid drive train is described in WO 2012/025434 A2, in which the internal combustion engine is connected to an electric generator in a torsion-resistant manner. In this case, misfirings of the internal combustion engine are recognized by evaluating the current and/or voltage curve at the output of the generator.

DE 102 27 528 A1 discloses a hybrid drive train having an internal combustion engine and an electric machine connected thereto in a torsion-resistant manner by means of a friction clutch, in which misfiring and rough running of the internal combustion engine are detected by means of a rotary encoder of the electric machine.

A non-hybrid drive train of a motor vehicle having an internal combustion engine and a torsional oscillation damper connected to the crankshaft is described in WO 2008/080378 A1, in which a faulty engine torque, for example due to combustion dropouts, is recognized and the internal combustion engine is controlled to compensate for the fault.

SUMMARY

The disclosure provides an exemplary method for improving a transmission quality of a drive torque of a hybrid drive train. In particular, the disclosure provides an exemplary method for improving comfort, efficiency and reducing damage to the hybrid drive train.

The proposed method is used to determine and eliminate rotational irregularities caused, for example, by misfiring, dropouts, and the like, in an internal combustion engine of a hybrid drive train that is subject to torsional vibrations. The hybrid drive train contains a first partial drive train with the internal combustion engine and a first device for detecting rotational characteristic values of the first partial drive train to control the internal combustion engine.

A second partial drive train contains an electric machine and a second device for detecting rotational characteristic values of the rotor to control the electric machine.

The two partial drive trains are connected to one another by means of a torsional elasticity for damping torsional vibrations of the internal combustion engine. The torsional elasticity can be designed as a torsional vibration damper. The torsional elasticity, for example in the form of a spring device that acts in the circumferential direction, for example arc springs arranged and distributed over the circumference, and thus the first partial drive train can be assigned to a primary flywheel mass and the second partial drive train can be assigned to a secondary flywheel mass, for example a rotor mass and/or the like, to achieve a dual-mass flywheel effect. At least one of the two partial drive trains, in particular the second partial drive train, can be assigned a centrifugal pendulum for speed-adaptive torsional vibration damping.

To be able to reliably and quickly identify and eliminate, if possible in real time, loss of comfort, loss of efficiency and/or damage to the torsional elasticity and the rest of the hybrid drive train, which are caused, for example, by misfiring and other irregularities, such as dropouts in the internal combustion engine, these are measured by comparing the rotational characteristic values determined by the two devices.

By evaluating the signals of both devices with regard to their rotational characteristic values and the time offset of the change therein, namely changes in the rotational characteristic values of the internal combustion engine and the electric machine, for example, it is possible to recognize which torques are acting on which mass of the partial drive trains. For example, it can be evaluated whether torque fluctuations are caused by the internal combustion engine or by the output of the hybrid drive train.

A comparison of these curves, for example with target values based on the controlling of the internal combustion engine, or a comparison with actual values of a preceding and subsequent working stroke of cylinders of the internal combustion engine, can provide a significant signal for misfiring or dropouts in real time.

For example, a comparison can be made based on a change in the rotational characteristic values as a result of at least two ignition curves in different cylinders that follow one another in direct succession. For example, three ignition curves can be continuously detected in a sliding manner, and an average ignition curve can be compared with the previous and subsequent ignition curve to detect a misfire in the event of a significant deviation. Alternatively, the ignition curves for the same cylinders can be continuously compared with one another with a short time delay, to be able to detect a cylinder-specific misfire in an improved manner in the event of a significant change in an ignition curve.

Alternatively or additionally, the comparison can be carried out using a change in the rotational characteristic values as a result of an ignition curve for at least one cylinder with a stored ignition curve for the at least one cylinder. Such ignition curves can be continuously adapted and evaluated as a function of the control of the internal combustion engine, for example as a function of control variables of the internal combustion engine such as throttle valve position, valve settings, and the like.

Alternatively or additionally, the comparison can be carried out based on a change in a rotational angle of the two partial drive trains with an unchanged control intervention in the internal combustion engine. If there is no control intervention with a changing torque, it can be assumed that a change in the rotational angle at the torsional elasticity can be traced back to misfiring.

The change in the rotational characteristic values can be detected and determined using a state estimator, for example.

The rotational characteristic values can be detected by the devices, for example as revolutions, rotational speeds, rotational accelerations, and/or rotational angles. From these detected rotational characteristic values, the kinetic and/or potential energy, the transmitted torques and/or the speeds and/or rotational accelerations present can be determined in the two partial drive trains and/or in the torsional elasticity using other system-inherent variables such as effective levers, transmission ratios, masses, and the like.

The rotational characteristic values of the second partial drive train can be detected and determined using a sensor device for controlling an electrically commutated electric machine.

A rotary encoder for the crankshaft, for example, can serve as the first device. For this purpose, a sensor ring can be arranged on the torsional elasticity, for example a torsional vibration damper, the increments of which are detected by a stationary sensor. One of one or a plurality of Hall sensors for detecting increments of the rotor for electronic commutation of the electric machine or a sensor device arranged at another location can be used as the second device. Alternatively, a state observer can be used as the second device, which determines the rotational characteristic values of the rotor and thus of the second partial drive train without sensors using electrical variables induced in the stator of the electric machine, such as induction currents, induction voltages, and the like, and thus controls the electric machine.

In contrast to the methods known from the prior art, the disruptive or damaging torsional vibrations are eliminated by means of the electric machine. In this case, an efficiency-, comfort-, and/or damage-dependent quality index of the torsional elasticity is determined by an analysis of the rotational characteristic values of both devices, and the electric machine is controlled to optimize the quality index. The speed of the hybrid drive train can be influenced by the controlled intervention of the electric machine in such a way that the quality of the torque transmission, for example the efficiency, the comfort or damage possibly caused over longer periods of time, is left within the resonance range of the torsional elasticity.

For example, vibration amplitudes can be determined by means of the devices and the vibration amplitudes can be reduced by controlling the electric machine. For example, vibrational energy can be extracted from the torsional elasticity by imposing a predetermined rotational non-uniformity on the electric machine by means of a corresponding control thereof. Such a targeted imposition of a rotational non-uniformity with a predetermined frequency and a corresponding phase angle of the electric machine can effectively avoid or counteract the influence of strong inputs of rotational non-uniformity, for example caused by impacts due to misfiring of the internal combustion engine.

For example, an existing resonance of the torsional elasticity can be determined by means of the devices and the resonance can be eliminated by means of a control of the electric machine. For example, by intervention of the electric machine, a currently present speed can be changed in such a way that a resonance-critical speed range of the torsional elasticity is left if the current speed can be changed.

If this cannot be changed, a resonant frequency that occurs can be modified by controlling the electric machine, for example, by effectively simulating a change in mass or a change in the mass moments of inertia of the effective masses, for example the primary centrifugal mass and/or secondary centrifugal mass of the torsional elasticity. For example, vibration energy can be withdrawn from the vibration system of the torsional elasticity by means of intervention by the electric machine, particularly when the vibration amplitudes present at the torsional elasticity have already reached a critical level and energy should be withdrawn from the torsional elasticity immediately.

For example, the quality index can be determined as a function of a relative torsional angle, the relative torsional speed and/or the relative acceleration between an input part and an output part of the torsional elasticity.

For example, after the quality index has been determined, the electric machine can be actuated by means of a controller for controlling the internal combustion engine or a higher-level vehicle controller or the like. For example, a determined quality index can be interpreted as the cause of misfires and the controller detecting the quality index can transmit a misfire signal to another controller such as a control device, for example the control device of the internal combustion engine. For example, a controller that is different from the controller of the electric machine can detect a misfire and control the actuation of the electric machine, for example to extract vibration energy from the vibration system. For example, the electric machine can be controlled directly as a function of the quality index determined by the devices. This means that the electric machine is controlled by the controller, which detects and evaluates the rotational characteristic values of the devices.

The electric machine can be controlled to minimize a difference in the rotational characteristic values of the devices. For example, a minimization of the amplitudes between peak-peak of a detected signal of the devices, for example a differential angle, can be provided over the course of time. For example, the electric machine can be controlled to minimize the rotational characteristic values to a predefined or predefinable value close to zero.

For example, the electric machine can be controlled in such a way that a predetermined value of the rotational characteristic values is not exceeded within stops of the torsional elasticity. This means that, in particular in the case of multi-stage regulation, the maximum limit on a torsional angle of the torsional elasticity is regulated before the stops are reached. If, due to the vibration energy present, a stop cannot be avoided, the electric machine can be controlled in such a way that the stop is reached at a minimum torsional speed.

For example, in the case of a rigid connection between the electric machine and the drive wheels and a separating clutch arranged between the electric machine and the drive wheels, it can be advantageous if the separating clutch is at least partially opened when the electric machine is controlled due to a loss of quality, i.e., a value that exceeds a value for a predetermined quality index. In this case, the remaining hybrid drive train can be decoupled completely or possibly only with a slip, for example with a downstream transmission, a differential, and the drive wheels.

BRIEF DESCRIPTION OF THE DRAWINGS

The invention is explained in more detail with reference to the exemplary embodiment in the single FIGURE.

FIG. 1 shows a schematic representation of a hybrid drive train.

DETAILED DESCRIPTION

A hybrid drive train 1 shown schematically contains partial drive trains 2, 3. The partial drive train 2 contains an internal combustion engine 4, here with four cylinders 5, and a crankshaft 6 driven in rotation thereby. A torsional elasticity 7, here a torsional vibration damper such as a dual-mass flywheel, is accommodated on the crankshaft 6, which separates the partial drive train 2 from the partial drive train 3. A device 8 for detecting rotational characteristic values of the crankshaft 6 and thus the control of the internal combustion engine 4 is assigned to the first partial drive train 2. For this purpose, a sensor ring is arranged on an input part of the torsional elasticity 7, from the increments of which a measurement signal is detected by a sensor and corresponding rotational characteristic values, for example the speed, the rotational angle, the rotational acceleration, and/or the like, are determined from this.

An output part of the torsional elasticity 7 is connected to a rotor 10 of an electric machine 9 in a rotationally locked manner. The electric machine 9 is assigned to the second partial drive train 3. The electric machine 9 is controlled by means of a device 11 for determining rotational characteristic values. For example, the device 11 can be formed from one or more Hall sensors, which are arranged on the rotor 10 or on a component connected thereto in a rotationally locked manner, to detect increments distributed around the circumference of the rotor 10 and to use these to determine the rotational characteristic values of the rotor 10, and to control the commutation of the electric machine 9 and to determine the position of the rotor 10 as a function of time. Alternatively, the electric machine 9 can be controlled without sensors by means of the device 11 in that the electrical variables of a stator 12 are detected and evaluated by means of a state observer.

To quickly and reliably determine misfiring of the internal combustion engine 4 in the proposed method, and to control the electric machine 9 in such a way that if a quality index determined as a function of the detected measured values of the device 8, 11 is exceeded, vibration energy is withdrawn from the torsional elasticity 7, or this is brought outside of a resonance range, and the signals of the devices 8, 11 are evaluated together by a controller 13. As a result, the rotational characteristic values of the partial drive trains 2, 3 and thus, with knowledge or modeling of the system properties of the hybrid drive train 1, influencing variables on the partial drive trains 2, 3 and the torsional elasticity 7, such as applied torques, rotational acceleration, mass moment of inertia, and the like, can be determined or at least estimated and the quality index determined therefrom.

For example, by comparing the rotational characteristic values of the devices 8, 11, the effect of ignition curves before and after the torsional elasticity 7 can be detected and the influence of misfiring on the two partial drive trains 2, 3 can be recognized, and the quality index can be determined, which, for example, is a measure of the efficiency of the hybrid drive train 1, the comfort acting on the vehicle and/or the damage to the hybrid drive train 1, in particular the torsional elasticity 7. For example, the shapes of successive ignition curves of the cylinders 5 can be compared with one another and dropouts can be recognized in real time from a change in the shapes. Alternatively or additionally, by observing the rotational angle between the crankshaft 6 and the rotor 10 under otherwise constant conditions, such as without engine intervention in the internal combustion engine 4 and without changing the control of the electric machine 9, misfires due to changes in the rotational angle can be recognized.

LIST OF REFERENCE SYMBOLS

1 Hybrid drive train
2 Partial drive train
3 Partial drive train
4 Internal combustion engine
5 Cylinder
6 Crankshaft
7 Torsional elasticity
8 Device
9 Electric machine
10 Rotor
11 Device
12 Stator
13 Controller

The invention claimed is:

1. A method for controlling a hybrid drive train including a first partial drive train with an internal combustion engine having a crankshaft and a second partial drive train, which is separated from the first partial drive train by a torsional elasticity, including an electric machine having a rotor, the method comprising:
   detecting a rotational characteristic value of the first partial drive train via a sensor arranged on the torsional elasticity;
   detecting a rotational characteristic value of the rotor via a device engaged with the rotor;
   determining a quality index based on the rotational characteristic value of the first partial drive train and the rotational characteristic value of the rotor; and
   controlling the electric machine to optimize the quality index;
   wherein the hybrid drive train includes a separating clutch downstream of the electric machine, the separating clutch being at least partially opened when the quality index exceeds a predetermined quality index.

2. The method according to claim 1, further comprising:
   determining a vibration amplitude at the torsional elasticity based on the rotational characteristic value of the first partial drive train and the rotational characteristic value of the rotor; and
   optimizing the quality index by controlling the electric machine to reduce the vibration amplitude.

3. The method according to claim 1, further comprising:
   determining an existing resonance of the torsional elasticity based on the rotational characteristic value of the first partial drive train and the rotational characteristic value of the rotor; and
   optimizing the quality index by controlling the electric machine to eliminate the existing resonance.

4. The method according to claim 1, further comprising determining the quality index as a function of a relative rotational characteristic value between the crankshaft and the rotor.

5. The method according to claim 1, further comprising, after determining the quality index, controlling the electric machine via a controller configured to control the internal combustion engine.

6. The method according to claim 1, further comprising controlling the electric machine as a function of the quality index.

7. The method according to claim 1, further comprising optimizing the quality index by controlling the electric machine to minimize a difference between the rotational characteristic value of the first partial drive train and the rotational characteristic value of the rotor.

8. The method according to claim 1, further comprising extracting vibration energy from the torsional elasticity by imposing a predetermined rotational non-uniformity on the electric machine via a controller.

9. The method according to claim 1, further comprising controlling the electric machine such that the rotational characteristic value of the first partial drive train and the rotational characteristic value of the rotor do not exceed corresponding predetermined values within stops of the torsional elasticity.

10. A hybrid drive train, comprising:
a first partial drive train including an internal combustion engine having a crankshaft
a second partial drive train including an electric machine having a rotor;
a torsional elasticity arranged between the first partial drive train and the second partial drive train, the torsional elasticity being connected to the crankshaft and the rotor;
a sensor arranged on the torsional elasticity and configured to detect a rotational characteristic value of the crankshaft;
a device engaged with the rotor and configured to detect a rotational characteristic value of the rotor;
a separating clutch downstream of the electric machine; and
a controller in communication with the sensor and the device, the controller being configured to:
receive the rotational characteristic value of the first partial drive train from the sensor;
receive the rotational characteristic value of the rotor from the device;
determine a quality index based on the rotational characteristic value of the first partial drive train and the rotational characteristic value of the rotor; and
control the electric machine to optimize the quality index;
wherein the separating clutch is at least partially opened when the quality index exceeds a predetermined quality index.

11. The hybrid drive train according to claim 10, wherein the controller is further configured to:
determine a vibration amplitude at the torsional elasticity based on the rotational characteristic value of the first partial drive train and the rotational characteristic value of the rotor; and
optimize the quality index by controlling the electric machine to reduce the vibration amplitude.

12. The hybrid drive train according to claim 10, wherein the controller is further configured to:
determine an existing resonance of the torsional elasticity based on the rotational characteristic value of the first partial drive train and the rotational characteristic value of the rotor; and
optimize the quality index by controlling the electric machine to eliminate the existing resonance.

13. The hybrid drive train according to claim 10, wherein the controller is further configured to determine the quality index as a function of a relative rotational characteristic value between the crankshaft and the rotor.

14. The hybrid drive train according to claim 10, wherein the device is a sensor configured to control electronic communication of the electric machine.

15. The hybrid drive train according to claim 10, wherein the device is a state observer configured to control the electric machine based on evaluating electrical variables in a stator of the electric machine.

16. The hybrid drive train according to claim 10, wherein the controller is further configured to optimize the quality index by controlling the electric machine to minimize a difference between the rotational characteristic value of the first partial drive train and the rotational characteristic value of the rotor.

17. The hybrid drive train according to claim 10, wherein the controller is further configured to extract vibration energy from the torsional elasticity by imposing a predetermined rotational non-uniformity on the electric machine.

18. The hybrid drive train according to claim 10, wherein the controller is further configured to control the electric machine such that the rotational characteristic value of the first partial drive train and the rotational characteristic value of the rotor do not exceed corresponding predetermined values within stops of the torsional elasticity.

* * * * *